United States Patent [19]
Wuester, Sr.

[11] Patent Number: 5,862,841
[45] Date of Patent: Jan. 26, 1999

[54] APPARATUS FOR FILLING A HYDRODYNAMIC BEARING

[75] Inventor: David Wuester, Sr., Santa Cruz, Calif.

[73] Assignee: Seagate Technology, Inc., Scotts Valley, Calif.

[21] Appl. No.: 847,274

[22] Filed: May 1, 1997

Related U.S. Application Data

[60] Provisional application No. 60/038,709 Feb. 20, 1997.

[51] Int. Cl.$^6$ .............................. B65B 31/04; B67C 3/26
[52] U.S. Cl. .............................. 141/284; 141/59; 141/65; 141/67; 141/250; 141/82
[58] Field of Search .................................. 141/4, 5, 7, 59, 141/65, 67, 250, 284, 82; 184/109; 384/100

[56] References Cited

U.S. PATENT DOCUMENTS

5,524,728  6/1996  Williams et al. ........................ 184/29
5,601,125  2/1997  Parsoneault et al. ..................... 141/51

*Primary Examiner*—J. Casimer Jacyna
*Assistant Examiner*—Tuan Nguyen
*Attorney, Agent, or Firm*—Westman, Champlin & Kelly, P.A.

[57] ABSTRACT

An apparatus for filling a hydrodynamic bearing with fluid. The apparatus includes a fill tube having first and second openings and a fluid reservoir having a reservoir opening. The first opening of the fill tube is aligned relative to a bearing channel opening for filling bearing channels. The second opening of the fill tube is selectively aligned relative to the fluid reservoir for filling bearing channels with fluid from the fluid reservoir via relative movement of the fill tube and fluid reservoir between a retracted position and a filling position. In the retracted position, the second opening of the fill tube is spaced from the reservoir and in the filling position, the second opening of the fill tube is immersed in the fluid reservoir to fill the bearing channels with fluid from the fluid reservoir.

19 Claims, 8 Drawing Sheets

APPARATUS FOR FILLING A HYDRODYNAMIC BEARING

CROSS-REFERENCE TO RELATED APPLICATION

This application claims priority from Provisional Application No. 60/038,709 filed Feb. 20, 1997 entitled "HYDRO DYNAMIC MOTOR OIL FILLING PROCESS".

BACKGROUND OF THE INVENTION

The present invention relates to an apparatus and method for filling a hydrodynamic bearing with bearing fluid. In particular, the present invention relates to a method and apparatus for filling a hydrodynamic bearing of a spindle motor of a disc drive.

Disc drive memory storage systems include disc packs which include a plurality of stacked discs which are supported for co-rotation about a spindle shaft coupled to a base of the disc drive. A spindle is supported for rotation about the spindle shaft. A hub is rotationally coupled to the spindle to support a plurality of stacked discs for rotation.

Known disc drives include a ball bearing system for rotationally supporting the spindle relative to the spindle shaft. However, due to microscopic surface imperfections, such as rough or uneven operating surfaces, ball bearings impart vibrations to rotating discs. This vibration results in misalignment between the read and write transducers of a data head and the data tracks on the surface of the disc, thus affecting the performance and operation of the disc drive. In hard drives in portable computers, transportation of the hard drive may exaggerate the misalignment and cause damage to the ball bearings, due to vibrations and shock introduced during transport. Additionally, ball bearings are not easily sealable to smaller dimensions, thereby limiting the physical dimensions of the disc drive.

Accordingly, hydrodynamic bearings are an alternative to ball bearing systems. In the case of hydrodynamic bearings, a fluid lubricant fills bearing channels defined between the spindle shaft and spindle to support the spindle for rotation about the spindle shaft. It is important to avoid the presence of any air bubbles within the bearing channels of the bearing. The absence of air bubbles will minimize the pressure buildup inside the motor due to drops in the ambient pressure and/or thermal expansion due to increased temperature. Pressure buildup can cause the bearing to leak hydrodynamic fluid. This absence of air bubbles helps eliminate hydrodynamic fluid leakage.

Hydrodynamic fluid leakage can cause contaminants to be expelled into the disc drive which can degrade disc performance. The loss of bearing fluid can also cause increase wear to the bearing surfaces of the spindle and the spindle shaft, leading to eventual failure of the bearing. Thus, it is desirable to provide an apparatus and method for filling bearing channels of a hydrodynamic bearing where air is evacuated from the bearing channels, which is efficient and cost effective and can operate without excessive human handling.

SUMMARY OF THE INVENTION

The present invention relates to a filling apparatus for filling bearing channels of a hydrodynamic bearing in a disc drive storage device. The apparatus includes a fill tube and fluid reservoir. The fill tube includes a first opening designed for alignment relative to bearing channels and a second opening. The fill tube and reservoir are coupled to a support assembly for relative movement between a retracted position and a filling position. In the retracted position, the second opening of the fill tube is spaced from the fluid reservoir and in the filling position, the second opening of the fill tube is immersed in the reservoir for filling bearing channels with fluid.

In one embodiment, the fluid reservoir includes a closed chamber sealed to the fluid reservoir. Fill tube extends through the closed chamber to the reservoir. A vacuum source and pressure source are selectively coupled to a chamber port opened to the closed chamber. Vacuum pressure is supplied via the vacuum source to the closed chamber while the fill tube is spaced from the fluid reservoir to supply a vacuum pressure through the fill tube to evacuate air from the bearing channels. Pressure is supplied to the closed chamber and the fluid reservoir, while the second opening of the fill tube is immersed in the reservoir to fill the bearing channels with fluid.

DETAILED DESCRIPTION OF THE PREFERRED EMBODIMENTS

Figure 1:
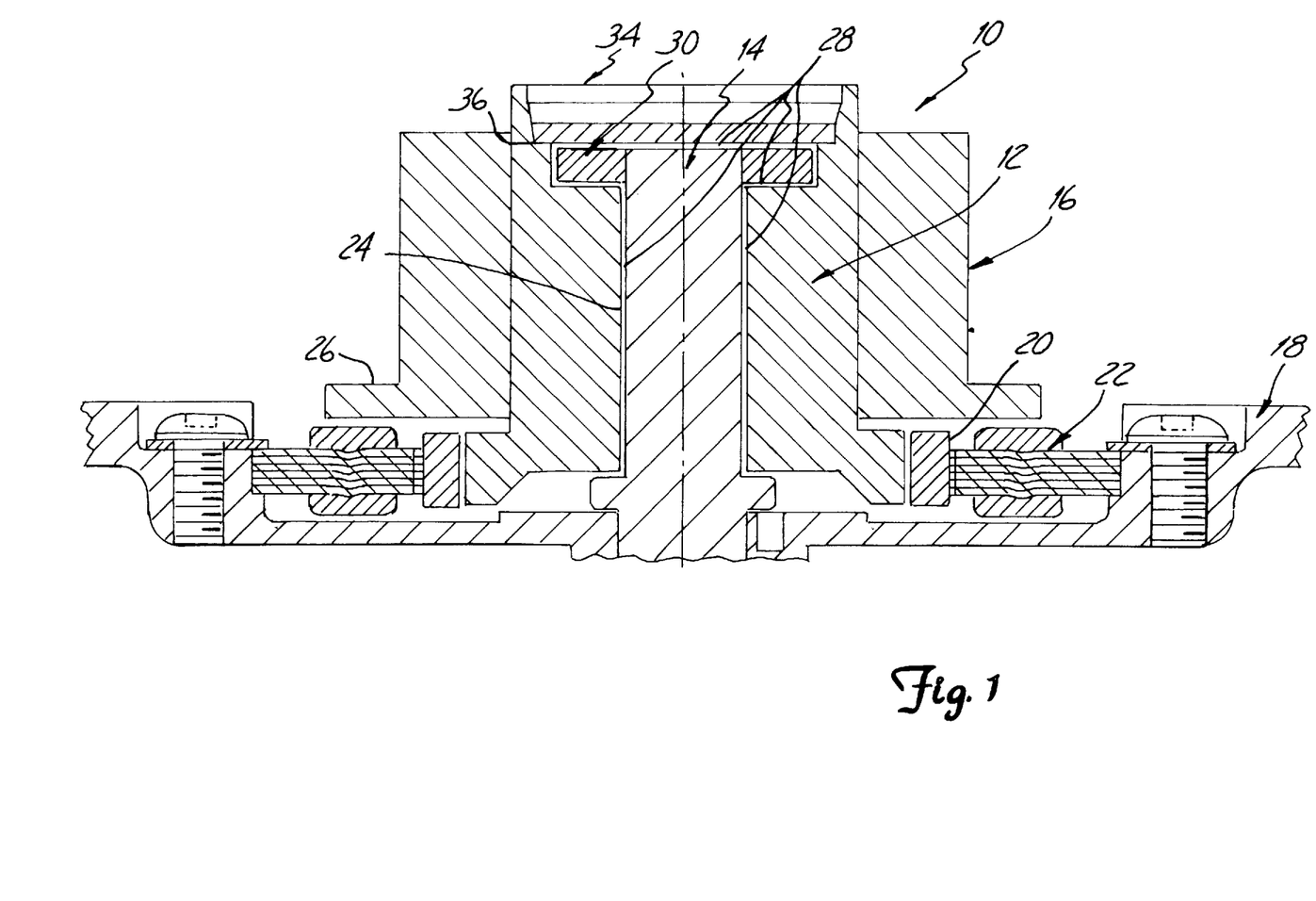
FIG. 1 is a cross-sectional view illustrating a spindle motor incorporating a hydrodynamic bearing.

FIG. 1 illustrates an embodiment of a hydrodynamic spindle motor 10 for rotationally supporting discs (not shown) of a disc drive. The spindle motor 10 includes a spindle 12, spindle shaft 14, hub 16, base 18, magnet 20, and stator 22. The spindle shaft 14 extends through a bore 24 of the spindle 12 to rotationally support the spindle 12 relative to the base 18, which is fixed relative to a housing of a disc drive (not shown). Hub 16 is coupled to spindle 12 and includes flange 26 for supporting discs (not shown). The magnet 20 is coupled to the spindle 12, and the stator 22 is coupled to the base 18. The magnet 20 and the stator 22 form the spindle motor 10 for rotating the spindle 12 (and hub 16) about the spindle shaft 14. Spindle 12 and spindle shaft 14 define the bearing 27 for the motor 10.

Fluid bearing channels 28 are formed in gaps between spindle 12 and spindle shaft 14 and are filled with a hydrodynamic fluid to support the spindle 12 for rotation relative to the spindle shaft 14. Hydrodynamic fluid may be a liquid or a gas. The spindle motor 10 also includes thrust plate 30, and clamp 34. Thrust plate 30 is set in a thrust plate cavity 36 in spindle 12 and includes a bore to rotationally couple the thrust plate 30 relative to spindle shaft 14. Clamp 34 caps an upper end of spindle shaft 14 and bearing channels 28 to secure thrust plate 30 within the thrust plate cavity 36. Thus, bearing channels 28 are formed between thrust plate 30 and spindle 12, thrust plate 30 and clamp 34 and spindle 12 and spindle shaft 14.

Figure 2:
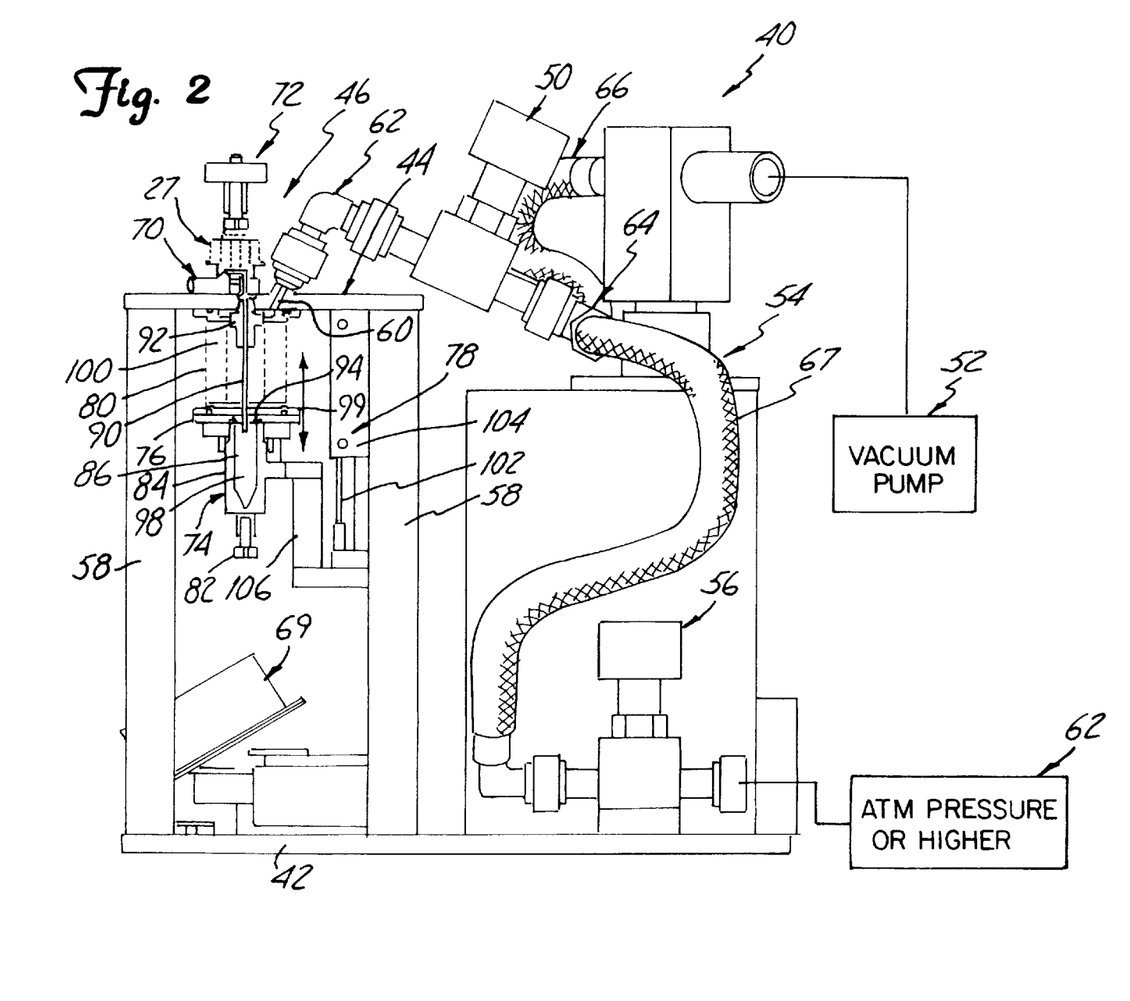
FIG. 2 is a side elevational view of a filling apparatus of the present invention, with components shown schematically.

The present invention relates to an apparatus and method for filling the bearing channels 28 of spindle motor 10. FIG. 2 is a side view of a filling apparatus 40 of the present invention which includes a base 42, a filling platform 44, filling station 46, control valve 50, vacuum pump 52, vacuum control valve 54 and pressure control valve 56. Filling station 46 is supported on the filling platform 44 which is fixed above base 42 by posts 58. The filling platform 44 includes through port 60 extending therethrough. The through port 60 is coupled to line 62 which extends to manifold 64. On-Off flow control through line 62 is controlled via valve 50.

A vacuum supply line 66 and pressure supply line 67 are selectively coupled to manifold 64 to supply positive or negative pressure to through port 60. Vacuum pump 52 is coupled to supply line 66. Line 67 is coupled to a pressure source 68 of at least atmospheric pressure or higher. The flow of positive pressure through line 67 is controlled via valve 56. The supply of vacuum pressure to line 66 is controlled via valve 54. Operation of the device is controlled by controller 69 as will be explained.

Filling station 46 includes nest 70, nest clamp 72, vial 74, movable vial holder 76, and vial actuator 78. The nest 70 is supported by the filling platform 44 and is designed to support a hydrodynamic bearing for filling. Nest clamp 72 is used to secure a hydrodynamic bearing on the nest 70 during a filling operation. The vial holder 76 is movably coupled relative to the filling platform 44 via a compressible bellows assembly 80. The vial 74 is secured to the holder 76 via vial clamp 82. The vial actuator 78 is operably coupled to the vial holder 76 to move the vial 74 between a retracted position and a filling position.

Vial 74 includes an outer container 84 having an inner retainer core 86. The area between the outer container 84 and inner retainer core 86 defines a fluid reservoir. An elongated fill tube 90 extends through a fill tube opening of filling platform 44 and is fixedly coupled thereto via plug 92. The fill tube 90 includes first and second openings at opposed ends. The first opening is aligned with nest 70 for supplying hydrodynamic fluid to a bearing supported at nest 70. Fill tube 90 extends from the filling platform 44 through channel 94 of holder 76 into an interior chamber 98 of the vial 74 defined by the retainer core 86.

In the retracted position of the vial 74 as shown in FIG. 2, the second opening of the fill tube 90 is opened to interior chamber 98. The retaining core 86 separating the interior chamber 98 from the fluid reservoir of the vial 74 extends from a top of container 84 to a distance spaced from the bottom of the container 84 to define a reservoir opening so that the bottom of the container 84 is filled with oil. In the fill position, not shown, the vial 74 moves as indicated by arrow 99 so that the second opening of fill tube 90 is immersed in the oil in the fluid reservoir. Although a specific construction of the fluid reservoir has been described, it is not intended that the invention be limited to any particular fluid supply source. It is contemplated that the fluid reservoir may encompass a stationary fluid supply source or a flowing fluid supply source.

Port 60 coupled to line 62 is fluidly coupled to a chamber 100 defined by bellow assembly 80. Chamber 100 is opened via channel 94 through holder 76 to the interior chamber 98 to supply vacuum pressure to the second opening of fill tube 90 in the retracted position. Chambers 100 and 98 define a closed chamber sealed to the fluid reservoir, and port 60 defines an opening to the closed chamber, to define a closed operating system coupled to the vacuum and pressure sources. In the filling position, the second opening of the fill tube 90 is immersed in the hydrodynamic fluid as previously explained and pressure is supplied to a surface of the oil opened to the interior chamber 98 via pressure source 68 to force fluid through fill tube 90 to rapidly fill the hydrodynamic bearing.

Vial actuator 78 includes an actuator rod 102 movable within cylinder 104 between a retracted position and an extended position. Rod 102 is coupled to vial holder 76 via lift arm 106. Thus, when rod 102 is in an extended position shown, lift arm 106 supports holder 76 and bellow assembly 80 in the retracted position and when rod 102 is in a retracted position, arm 106 moves holder 76 and bellow assembly 80 toward filling platform 44 so that vial 74 is in the filling position with the second opening of the fill tube 90 immersed in the fluid reservoir. Preferably, vial actuator 78 is a pneumatically operated cylinder system. However, the vial actuator 78 is not limited to any particular actuation system and is intended to include manual actuation systems as well as other actuation systems.

Figure 3:
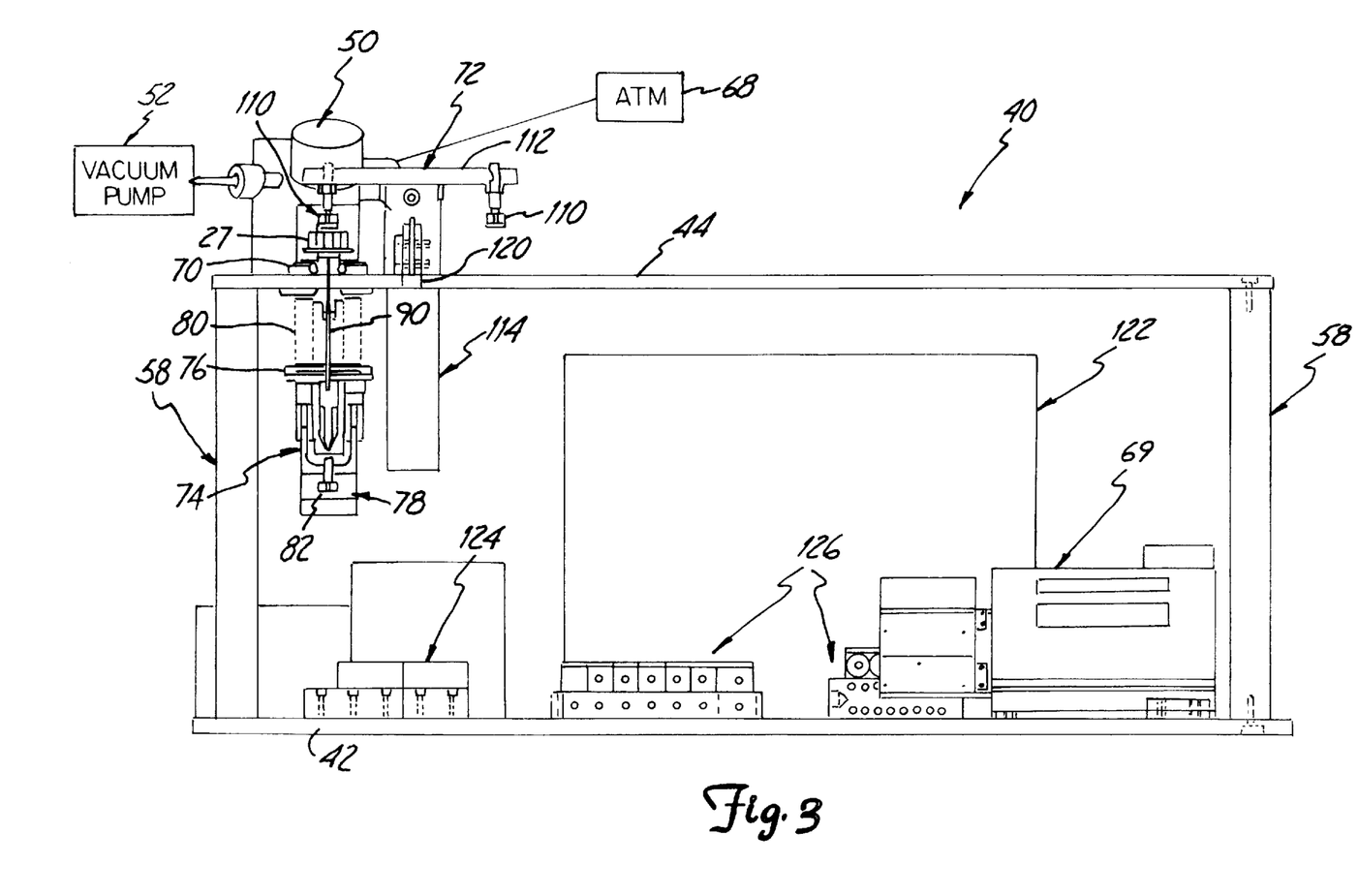
FIG. 3 is a front elevational view of the filling apparatus of FIG. 2.

FIG. 3 is a front view of the filling apparatus 40. Clamp 72 includes clamp member 110, clamp arm 112, and actuator 114. Clamp arm 112 may be designed to support a plurality of clamp members 110 for use in clamping multiple hydrodynamic bearings 27 for multiple filling stations 46 (only one filling station 46 is shown in FIG. 3). Clamp actuator 114 is coupled to clamp arm 112 to raise and lower clamp arm 112 between a clamping position (shown) and a retracted position (not shown) as well as rotate clamp arm 112 between a clamping alignment (shown) where clamp members 110 are aligned with nest 70 and an opened alignment, where clamp members 110 are positioned out of alignment with nests 70 so that bearings 27 may be easily loaded onto and removed from nests 70. The clamp actuator 114 includes a pneumatic actuating system which raises and lowers arm 112 as well as rotationally actuates arm 112. It should be understood that the clamp actuator is not limited to a pneumatic actuated clamping system, and other clamping systems may be employed.

Thus, to secure hydrodynamic bearings in nests 70, the clamp actuator 114 rotates the clamp arm 112 to the clamping alignment position for aligning cramp members 110 with nests 70. Thereafter, the actuator 114 lowers the clamp arm 112 to clamp a hydrodynamic bearing in place. After a filling operation is complete, the clamp actuator 114 raises clamp arm 112 from the nest 70 and then rotates the clamp arm 112 to the opened alignment so that filled hydrodynamic bearings 27 can be easily removed.

Nests 70 include heaters 120, temperature sensors (not shown) and a temperature control system 122. Sensor blocks 124 are coupled to base 42 to support temperature sensors. Nest heaters 120 are operably coupled to temperature control system 122 to heat nests 70 depending upon the difference between the desired temperature and the temperature measured by the temperature sensors. The nest 70 is heated to a temperature sufficient to thin the hydrodynamic fluid to reduce the viscosity of the fluid to speed the filling process. Operation of the system is controlled via controller 69 which includes programmed operating instructions. Clamp actuator 114 and vial actuator 78 are preferably pneumatically operated systems. Air pressure supplied to operate the actuator 114 and actuator 78 is controlled via valves 126 supported by valve manifolds and operated by controller 69.

Figure 4:
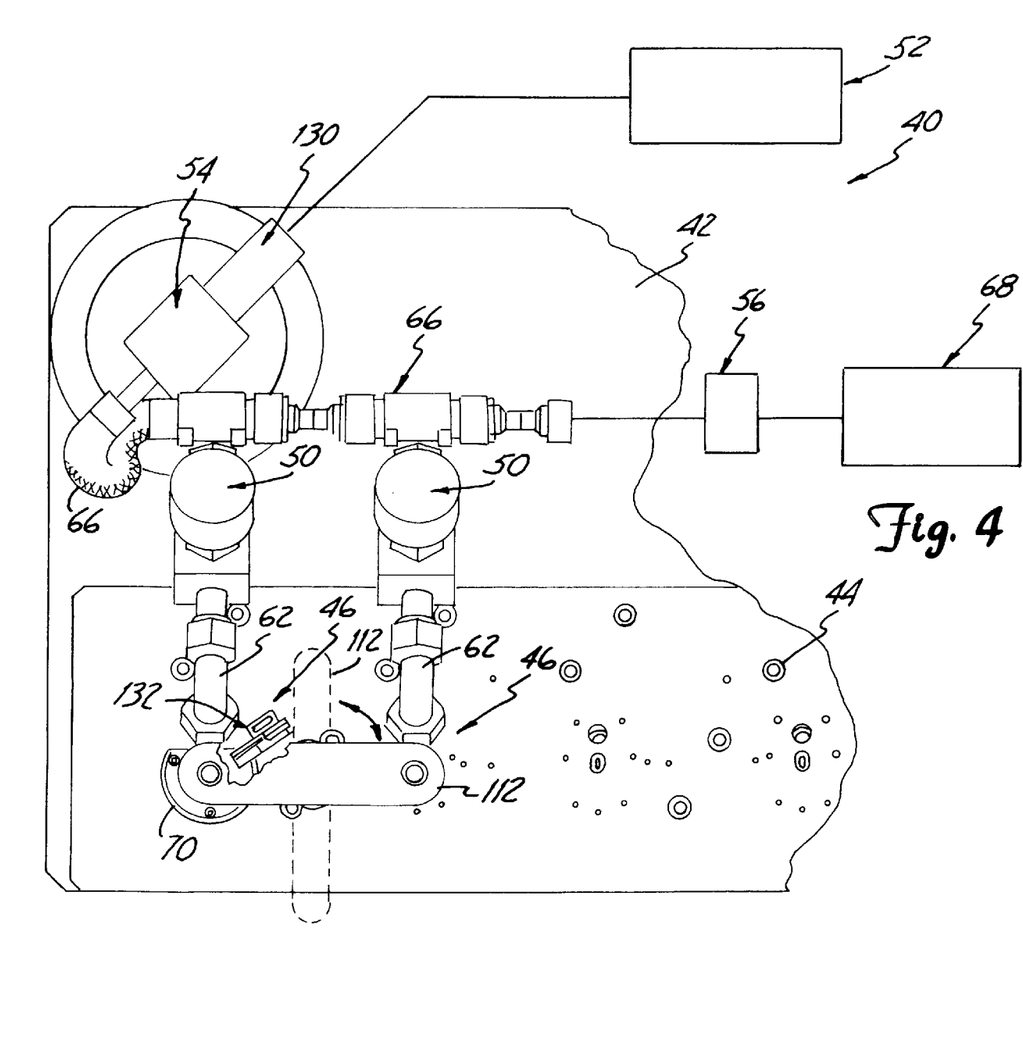
FIG. 4 is a partial top plan view of the filling apparatus of FIGS. 2 and 3, with components shown schematically.

FIG. 4 1s a top plan view of the apparatus 40 shown in FIGS. 2–3 including multiple filling stations 46. It should be understood that any number of filling stations 46 may be used to increase the filling capacity of the apparatus 40. Clamp arm 112 is illustrated in the clamping alignment position for clamping multiple bearings. The position of clamp arm 112 in the opened alignment position for removing multiple bearings after completion of a filling cycle is shown in phantom. A vacuum gage 130 is coupled to the vacuum line 66 to measure the pressure in line 66 as will be explained. An optical sensor 132 is coupled to nest 70 to detect the presence of a bearing in nest 70.

Figure 5:
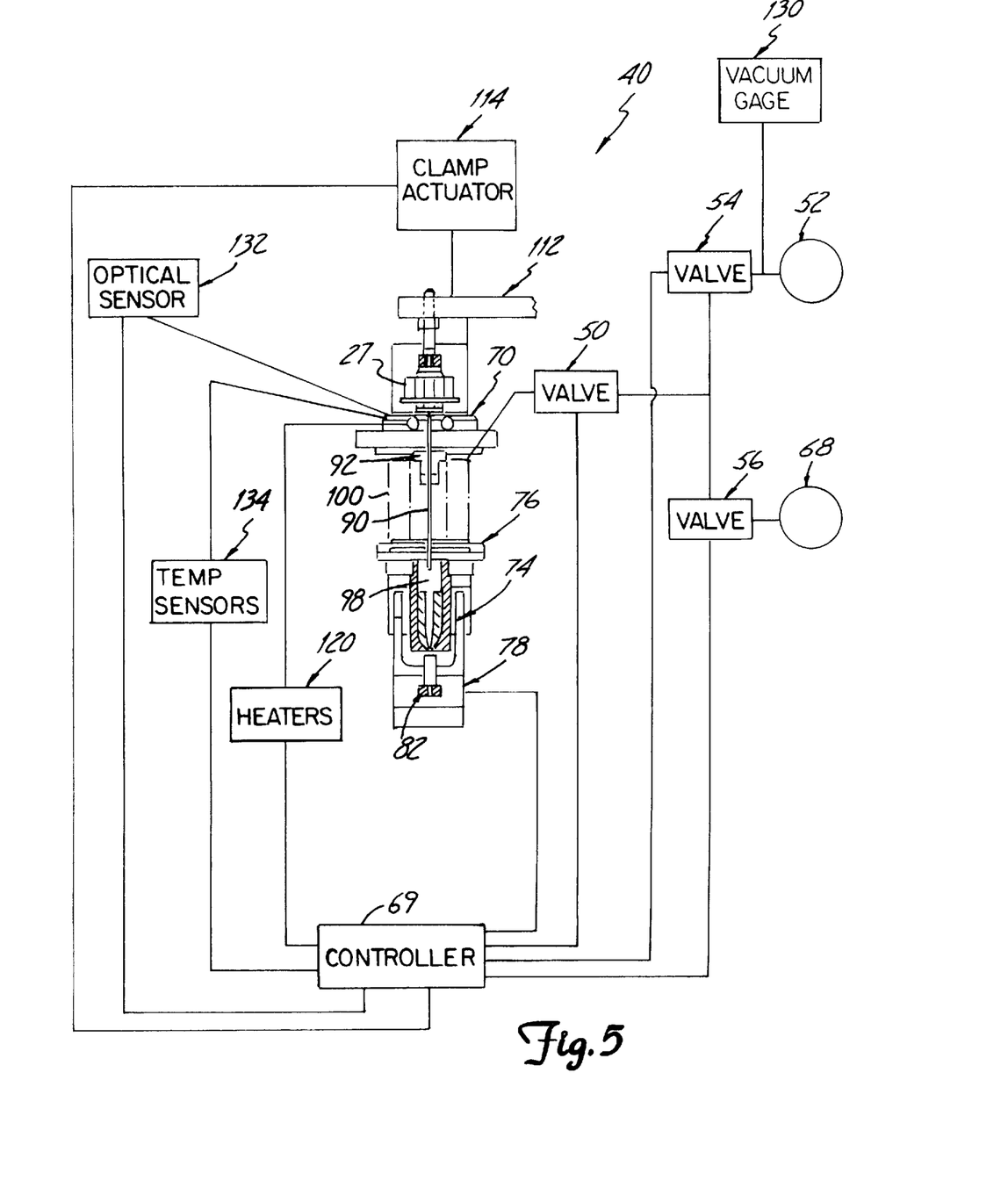
FIG. 5 is a diagrammatic illustration of the operation of the filling apparatus of the present invention.

FIG. 5 is a schematic view of the operation of the apparatus 40 via controller 69. Preferably, the components of the present invention are automatically controlled via controller 69. In particular, valve 50, valve 54, valve 56, vial actuator 78, clamp actuator 114, heaters 120 of the temperature control system, optical sensor 132, and temperature sensors 134 are coupled to controller 69 and operable thereby.

Prior to operation, bearings are positioned on nests 70 for filling. Optical sensor 132 detects the presence of bearings in nest 70 and signals to the controller 69 to operate the clamp actuator 114 to clamp the bearings in the nests 70. The temperature sensor 134 measures the temperature of the nests 70. The sensed temperature of the nests 70 is used to operate heaters 120 to elevate the temperature of the nests 70 to the desired temperature.

Control or station valve 50 is opened by the is controller 69 for each filling station 46 having a bearing supported in nest 70. Prior to the filling operation, the vial 74 is supported in a retracted position. Initially, the apparatus operates to remove air from the fluid bearing channels 28. Controller 69 opens valve 54 and supplies a vacuum pressure to the fill tube 90 opening for a predetermined time period to evacuate air from the bearing channels 28. Preferably the predetermined time period is approximately 90 seconds.

Since vacuum pressure is supplied directly to the fill tube opening through closed chamber and not through the fluid reservoir, more rapid and complete evacuation of the bearing channels is accomplished since back pressure caused by the weight of the fluid is eliminated. Since the fill tube 90 opening is spaced from the fluid reservoir, the fluid is not aerated by air evacuated from the bearing channels. Also, the closed design of the fluid reservoir and chamber eliminates the problem of fluid vapors escaping during the evacuation and filling process and being deposited on the bearing.

Vacuum gage 130 measures pressure in the vacuum line 64 and uploads the measured pressure to the controller 69 to determine if the pressure is within a predefined range in order to assure proper operation of the vacuum. If the vacuum gage 130 does not measure within predefined parameters, an error signal is generated to cease operation of the apparatus.

After the evacuation period is complete, vial actuator 78 moves the vial 74 to the filling position so that the opening of the fill tube 90 is immersed into the hydrodynamic fluid in the fluid reservoir. The vacuum valve 54 is closed and the pressure valve 56 is opened to atmosphere or higher pressure. Since valves 50 and 56 are opened, positive pressure (i.e., atmosphere or higher) is supplied to an opened portion of the reservoir to force fluid into and through the fill tube 90 into the fluid bearing channels 28. Pressure is supplied to the reservoir and the bearing is filled for a predetermined period of time, approximately 30 seconds.

Figure 6:
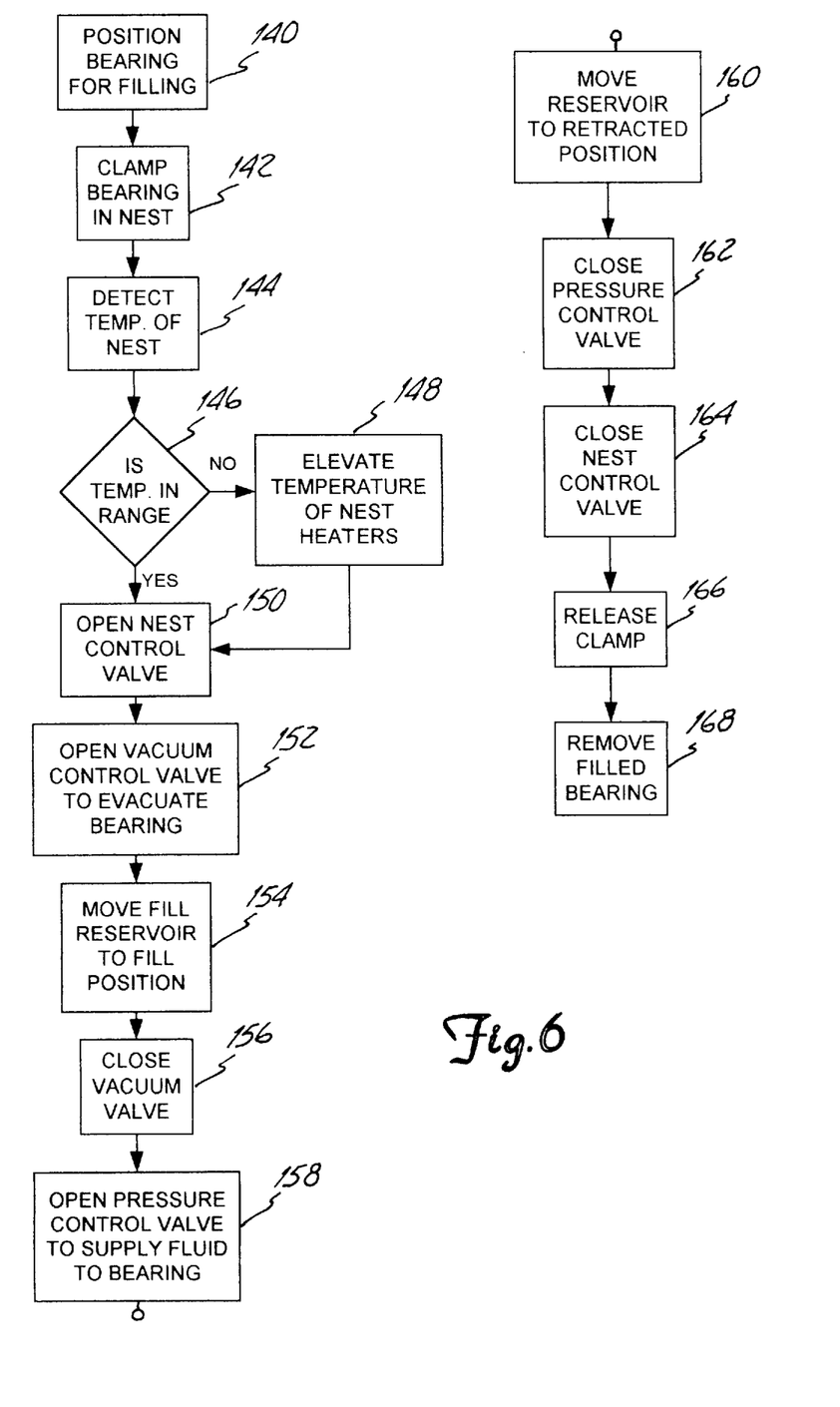
FIG. 6 is a flow diagram of the operation of the filling apparatus of the present invention.

FIG. 6 is a flow diagram illustrating the steps of operation for the apparatus of the present invention. Bearings are mounted in nests 70 and are clamped for filling as illustrated by blocks 140 and 142. Thereafter the temperature of the nest 70 is detected, as illustrated by block 144. The measured temperature is compared with desired temperature ranges and the temperature is adjusted if the temperature is not within the desired range as illustrated by blocks 146 and 148. Valves 50 and 54 are opened as illustrated by blocks 150 and 152 to supply vacuum pressure to evacuate air from the bearing channels 28. The pressure supplied is sufficient to withdraw air from the bearing channels 28 but not large enough to withdraw fluid from the reservoir. Preferably, the vacuum pressure supplied is approximately 100 millitorr or less.

After air has been evacuated from bearing channels 28, the vial 74 is moved to the filling position as illustrated by block 154 to immerse fill tube 90 in fluid. Vacuum control valve 54 is closed and pressure control valve 56 is opened as illustrated by blocks 156 and 158 to supply pressure to the reservoir to force fluid from the reservoir into the fill tube opening for delivery to the bearing channels. After the bearing is filled for a predetermined period of time, the vial 74 is moved to the retracted position and the valves 56 and 50 are closed as illustrated by blocks 160–164. Clamp 72 is released and the filled bearing is removed as illustrated by blocks 166 and 168.

Figure 7:
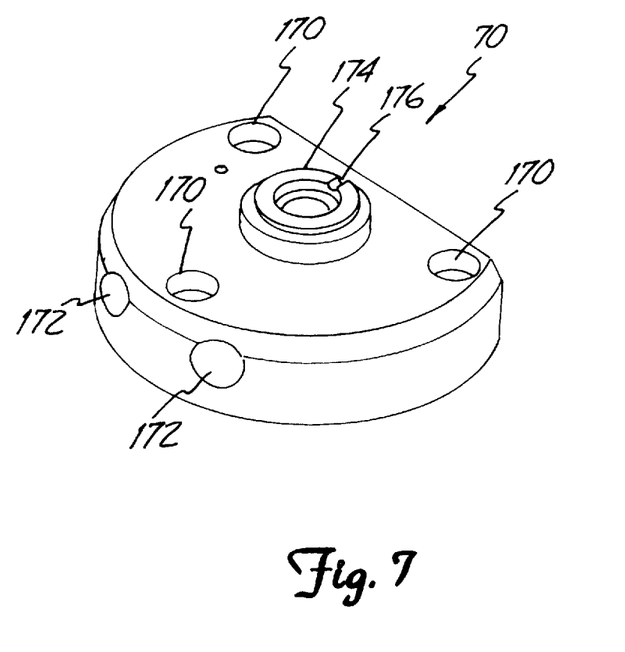
FIG. 7 is a perspective view of a bearing nest.
Figure 8:
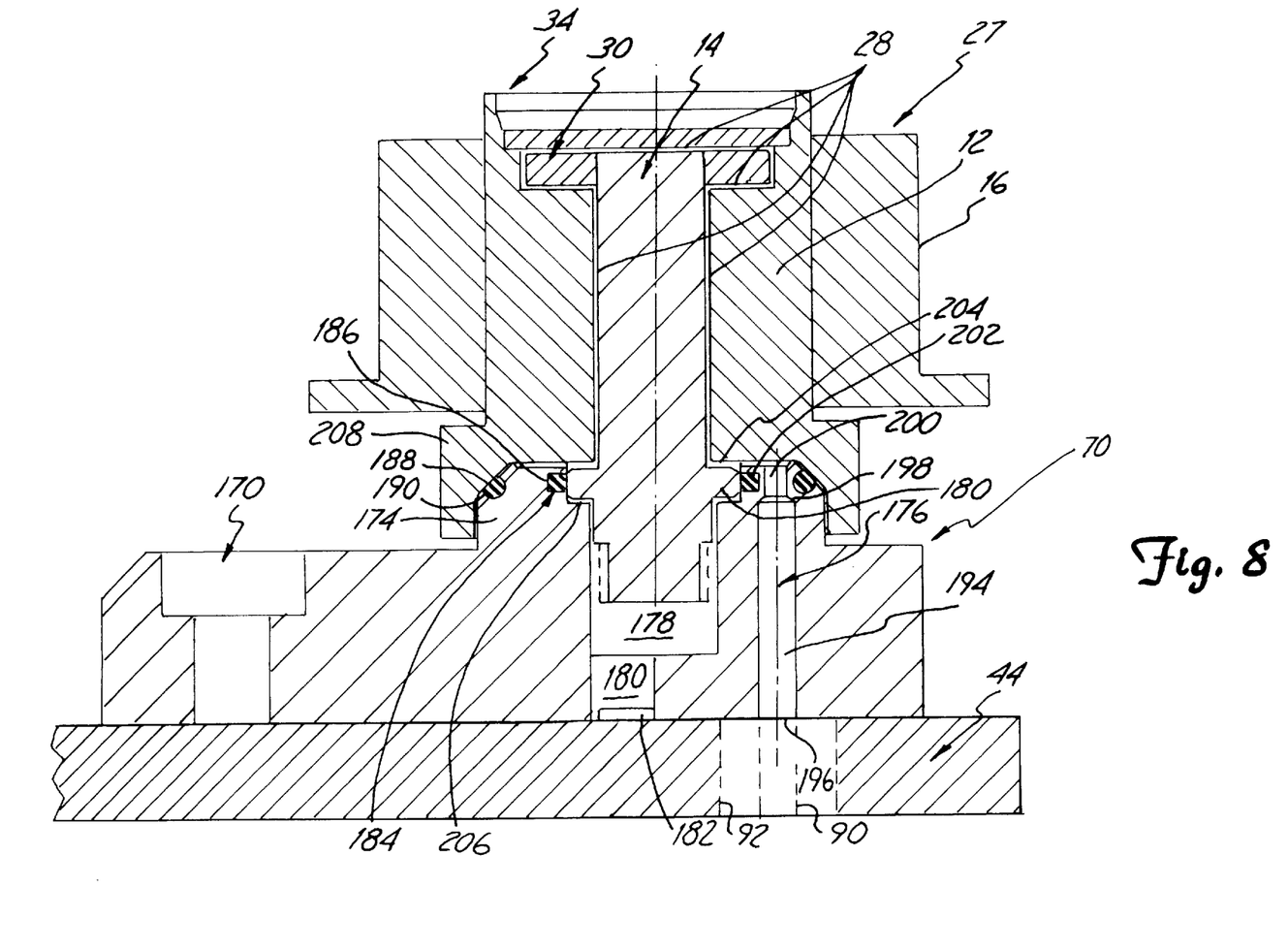
FIG. 8 is a cross-sectional view of the bearing nest of FIG. 7 fixed to a platform and having a bearing supported thereby.

FIGS. 7–8 illustrate a preferred construction of nest 70. Nest 70 is formed of rigid member secured to filling platform 44 via countersunk bores 170. The nest 70 includes heating ducts 172, a raised bearing seat 174 and channel 176. The heating ducts 172 extend through the nest 70 to heat nest 70. FIG. 8 illustrates the raised bearing seat 174 and channel 176. Raised bearing seat 174 includes a stepped cavity 178 sized to support spindle shaft 14 at collar 180. Stepped cavity 178 is opened to the atmosphere via relief channels 181 and 182 to prevent pressure buildup during the bearing installation to the system.

O-rings 184 are seated in an O-ring groove 186 to align with the collar 180 supported in stepped cavity 178. O-ring 188 is seated in an O-ring groove 190 on a sloped support surface of the raised bearing seat 174. Vacuum pressure and hydrodynamic fluid sources are coupled to bearing channels 28 between the spindle shaft 14 and spindle 12 via channel 176. Channel 176 includes a first diameter portion 194 extending between platform port 196 and a chamfered section 198 connecting the first diameter portion 194 to a second diameter portion 200. The second diameter portion 200 is opened to a transverse channel 202 which is opened to a traverse bearing channel opening 204 between the collar 180 of spindle shaft 14 and spindle 12.

An extended portion of spindle shaft 14 extends into the stepped cavity 178 so that collar 180 is supported by step 206. O-ring 184 provides a fluid seal between collar 180 and the stepped cavity 178 so that fluid does not leak into the system and is directed into the bearing channels 28. Bearing channel openings 204 include a barrier film which is baked on to prevent fluid from leaking out of the traverse bearing channel opening 204. The spindle 12 includes a flanged portion 208 which extends about bearing seat 174 and is supported thereby. O-ring 188 provides a seal between the flanged portion 208 and bearing seat 174 so that fluid does not leak from the system. Although a specific embodiment of the nest 70 has been illustrated, the present invention is not limited to the specific embodiment shown.

As described, the present invention provides an apparatus for evacuating air from and filling bearing channels through a fill tube which selectively couples to a fluid reservoir. A vacuum pressure source is coupled to the fill tube opening to supply vacuum pressure, while the fill tube opening is spaced from the reservoir. Since vacuum pressure is supplied directly to the fill tube opening and not through the fluid in the reservoir, more rapid and complete evacuation of the bearing channels is accomplished since back pressure caused by the weight of the fluid is eliminated. Since the fill tube is spaced from the fluid reservoir when air is evacuated and is not immersed in the fluid reservoir, the fluid is not aerated by air evacuated from the bearing channels.

The embodiment of the present invention shown illustrates a fixedly supported fill tube and a fluid reservoir moveable relative to the fill tube for selectively immersing the fill tube in the fluid reservoir. It should be understood that the present invention is not intended to be limited to the embodiment shown and that the reservoir may be fixedly supported and the fill tube may be designed to move relative to the reservoir or both the fill tube and reservoir may move for selectively immersing the fill tube in the reservoir.

Although the present invention has been described with reference to preferred embodiments, workers skilled in the art will recognize that changes may be made in form and detail without departing from the spirit and scope of the invention.

What is claimed is:

1. An apparatus for filling a hydrodynamic bearing of a disc drive information storage system with fluid comprising:
   a base;
   a fill tube having first and second openings, the first opening being adapted for alignment with a fluid channel of a bearing;
   a fluid reservoir having a reservoir opening;
   a support assembly coupled to the base, fill tube and fluid reservoir for supporting the fill tube and fluid reservoir for relative movement between a retracted position and a filling position, in the filling position, the second opening of the fill tube is immersed in the fluid reservoir and in the retracted position, the second opening of the fill tube is spaced from the fluid reservoir; and
   an actuation assembly coupled to the support assembly for operating the fill tube and fluid reservoir between the retracted position and the filling position.

2. The apparatus of claim 1 wherein the fill tube is fixedly supported relative to the base and the fluid reservoir is moveable supported relative to the fill tube between the retracted position and the filling position.

3. The apparatus of claim 2 including a closed chamber sealed to the fluid reservoir, wherein the fill tube extends through the closed chamber to the reservoir.

4. The apparatus of claim 3 wherein the closed chamber includes a chamber port.

5. The apparatus of claim 4 including a vacuum supply source coupled to the chamber port.

6. The apparatus of claim 5 including a control valve coupled between the vacuum supply source and chamber port for controlling the supply of vacuum pressure to the closed chamber.

7. The apparatus of claim 4 including a pressure source coupled to the chamber port.

8. The apparatus of claim 7 including a control valve coupled between the chamber port and pressure supply for controlling air pressure to the closed chamber.

9. The apparatus of claim 3 wherein the closed chamber is formed of a flexible bellows assembly operably coupled to the fluid reservoir and fixed fill tube support, the bellows assembly expanding and contracting for movement of the reservoir between the retracted position and the filling position.

10. The apparatus of claim 9 wherein the support assembly includes:
    a platform supported above the base via posts, the platform including a fill channel coupled with the fill tube, the bellows assembly being coupled to the platform so that the platform forms a portion of the closed chamber, and a channel through the platform defines the chamber port to the closed chamber; and
    a nest coupled to the platform and including a fluid channel and a bearing support, the fluid channel being coupled to the fill channel of the platform.

11. The apparatus of claim 10 including:
    a nest clamp aligned relative to the nest and movably supported between a retracted position and a clamped position, in the retracted position, the nest clamp being spaced from the nest, and in the clamped position, the nest clamp adapted to secure a bearing for filling.

12. The apparatus of claim 10 including:
    a heater coupled to the nest to heat the nest.

13. The apparatus of claim 12 including a temperature gage coupled to the nest to responsively control the heater.

14. The apparatus of claim 10 including a sensor for detecting a bearing in the nest.

15. The apparatus of claim 1 wherein the actuation assembly is a pneumatic actuation assembly.

16. The apparatus of claim 1 including a controller coupled to the actuation assembly to automatically control filling of bearings.

17. The apparatus of claim 1 including a plurality of filling stations for filling a plurality of bearings, each filling station including a fill tube.

18. The apparatus of claim 17 wherein each filling station includes a separate reservoir.

19. The apparatus of claim 18 including a closed chamber sealed to each fluid reservoir, wherein the fill tube extends through the closed chamber to the reservoir, the closed chamber including a chamber port, each chamber port being coupled to a central manifold which is selectively coupled to a vacuum supply source and a pressure source.

* * * * *